2,831,031
Patented Apr. 15, 1958

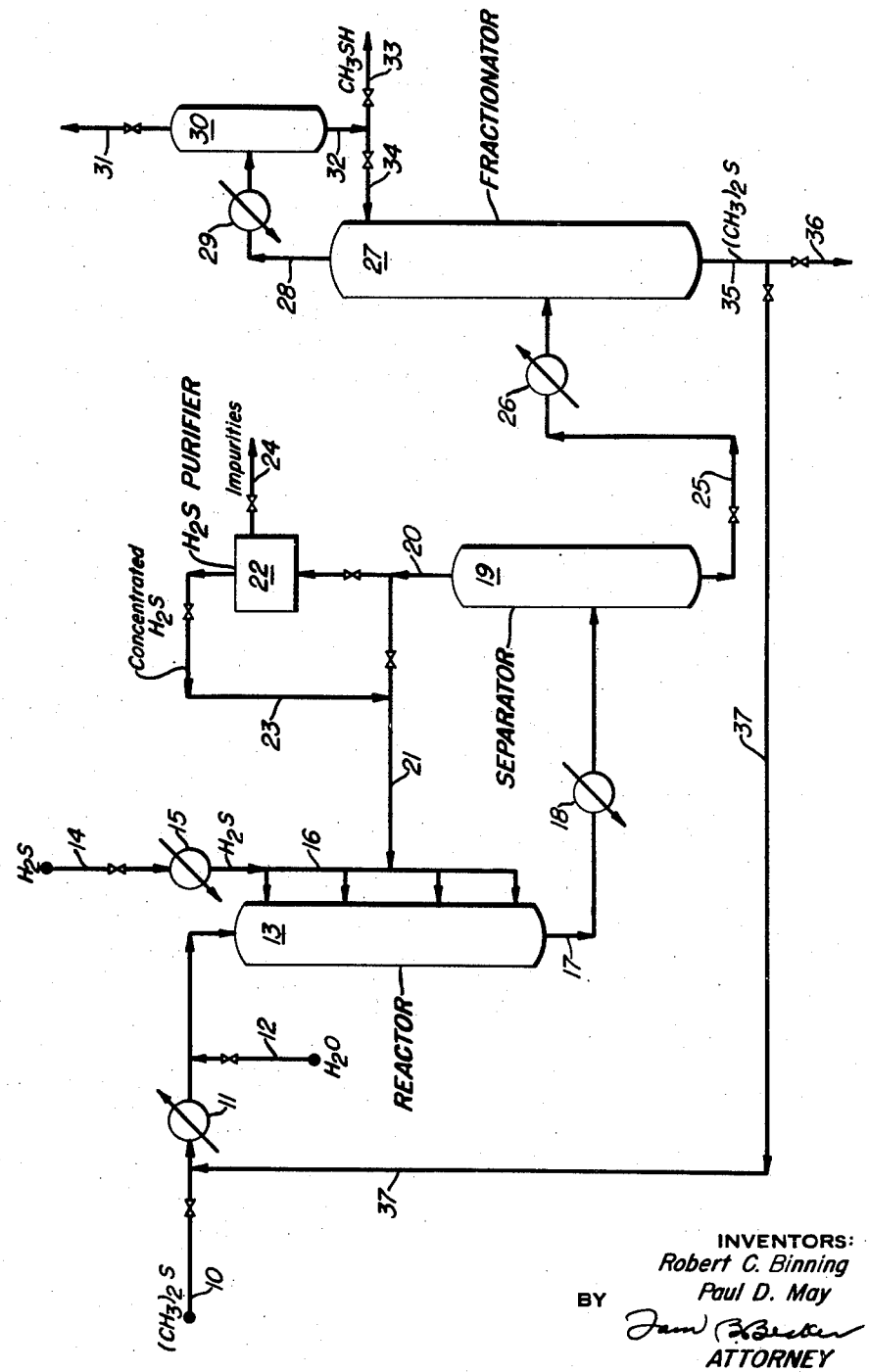

2,831,031

CONVERSION OF ORGANIC SULFUR COMPOUNDS

Robert C. Binning, Texas City, and Paul D. May, Galveston, Tex., assignors, by mesne assignments, to The American Oil Company Application February 16, 1954, Serial No. 410,518

16 Claims. (Cl. 260—609)

This invention relates to a process for the conversion of hydrocarbon sulfides to mercaptans. More particularly, the invention relates to the conversion of alkyl sulfides to mercaptans. In one specific and commercially important form, this invention relates to a process for the catalytic conversion of methyl sulfide to methyl mercaptan.

One object of our invention is to provide a facile catalytic process for the conversion of methyl sulfide and hydrogen sulfide to methyl mercaptan. Another object is to provide a catalytic process for the conversion of higher alkyl sulfides or other hydrocarbon sulfides to the corresponding mercaptans. An additional object is to provide novel catalysts for the reaction of hydrocarbon sulfides with hydrogen sulfide to produce mercaptans. These and other objects of our invention will become apparent from the ensuing description thereof.

Briefly, mercaptans are synthesized according to the present process by contacting a feed stock consisting essentially of a hydrocarbon sulfide and hydrogen sulfide with a solid pentavalent phosphorus acid olefin polymerization catalyst under suitable reaction conditions. The molar ratio of hydrogen sulfide to hydrocarbon sulfide can be varied between about 0.25 and about 10 and is preferably at least about 1, for example about 1 to about 2. The feed stock is contacted with the solid catalyst at a temperature between about 500° F. and about 700° F., and usually between about 525° F. and about 625° F. Relative low boiling hydrocarbon sulfides may be treated in the vapor phase and high boiling sulfides containing more than about 6 carbon atoms per molecule can be treated as a liquid phase or mixed liquid-vapor phase. The reaction is apparently not sensitive to pressure and can, therefore, be effected at pressures ranging from below atmospheric, for example, about 5 p. s. i. a. to high pressures of the order of about 2000 p. s. i. a. The use of high pressures increases the space-time yield and permits the use of relatively small reactors.

The present process may be practiced with a wide variety of hydrocarbon sulfides either of the symmetrical or unsymmetrical type. Various methods are known for the preparation of suitable hydrocarbon sulfide charging stocks (note, for example, R. B. Wagner and H. D. Zook, "Synthetic Organic Chemistry," chapter 32, John Wiley & Sons, Inc., N. Y. (1953); Henry Gilman, "Organic Chemistry, an Advanced Treatise," page 854 ff. of vol. 1, second edition, John Wiley & Sons, Inc., N. Y. (1949)). In addition, it may be noted that by careful fractional distillation, it is possible to obtain highly concentrated lower alkyl sulfides from various petroleum fractions; the contaminants in these alkyl sulfide fractions are usually paraffinic hydrocarbons which are inert in the process of the present invention. In its preferred form, the invention is practiced on a feed stock consisting essentially of hydrogen sulfide and methyl sulfide, but it may be practiced also with sulfides having the formula $R_1SR_2$ wherein $R_1$ and $R_2$ are monovalent hydrocarbon radicals which may be the same or different and which may be, for example: (a) alkyl radicals such as ethyl, n-propyl, isopropyl, n-butyl, isobutyl, t-butyl, n-amyl, isoamyl, n-octyl, 2,2,4-trimethylpentyl, n-dodecyl, and the like; (b) cycloalkyls such as cyclopentyl, sec.-methylcyclopentyl, t-methylcyclopentyl, ethylcyclopentyl, cyclohexyl, alkylcyclohexyl, and the like; (c) aryl and substituted-aryls such as phenyl, tolyl, xylyl, cyclohexylphenyl, ethylphenyl, chlorophenyl, nitrophenyl, bromotolyl, and the like.

Methyl sulfide and hydrogen sulfide for use as charging stock in the present process can be obtained by the conversion of methanol and hydrogen sulfide to methyl sulfide and methyl mercaptan in the presence of a solid phosphoric acid catalyst. The methyl sulfide product and excess hydrogen sulfide derived from said process can be blended in suitable proportions to form the charging stock to the process of the present invention.

The solid catalyst employed in accordance with this invention is a supported pentavalent phosphorus acid olefin polymerization catalyst, which is to say, a supported phosphoric acid such as ortho-, meta- or pyro-phosphoric acid, triphosphoric acid, tetraphosphoric acid and the like. The catalyst is considered to be an olefin polymerization catalyst for the purposes of definition herein when it evidences substantial catalytic activity for the polymerization of propylene or a butylene at temperatures between about 50 and 250° C. and olefin partial pressures between about 50 and about 1500 p. s. i. g. in the vapor phase in contact with said catalyst at space velocities between about 1 and about 4 cu. ft. of gas per hour per pound of solid catalyst.

Solid phosphoric acid catalysts which can be used for the purposes of the present invention are well known. One commercially available form of catalyst is prepared by the treatment of kieselguhr with pyrophosphoric acid and the resultant product is calcined and rehydrated before use. The concentration of phosphoric acid, as 100% acid, in the catalyst, is at least about 30 weight percent and can be between about 30 and about 90 weight percent of the total weight of catalyst. These catalysts may be promoted with metal phosphates such as those of copper, aluminum or iron, in proportions between about 2 and about 20 weight percent, based on the weight of the phosphoric acid in the catalyst. Catalysts of the variety described immediately hereinabove have been described in various United States Letters Patent, including the following: 2,275,182; 2,116,151; 2,102,073–4; 2,157,208; 2,300,126; 2,057,433; 2,275,182 and 2,498,607. In addition, it may be noted that phosphoric acid catalysts can be made by the extension of the acid on activated alumina or activated carbon, although these supports are less desirable than kieselguhr. Reactive alumino-silicates, for example, various clays, have also been employed as supports for phosphoric acid catalysts.

A distinct form of solid phosphoric acid catalyst can be prepared by coating a nonporous, non-reactive support, such as glassy quartz fragments or fused silica with meta, pyro- or ortho-phosphoric acid, preferably the latter. Usually these catalysts are prepared by depositing the quartz or silica fragments in the reaction tower, trickling a relatively dilute aqueous solution of phosphoric acid therethrough to provide a coating of acid, and thereafter passing a hot inert gas through the catalyst bed to evaporate water therefrom and to concentrate the catalyst to about 100–110% acid, for example, $H_3PO_4$, which is equivalent to a $P_2O_5$ concentration of 72.5–80 weight percent (note, for example, U. S. 2,135,793).

An additional type of solid pentavalent phosphorus acid olefin polymerization catalyst which may be employed for the purposes of the present invention comprises a reducible metal pyrophosphate, for example, pyrophosphates of Cu, Mg, Zn, Hg, Al, Fe and Co. These catalysts are acidic, i. e., they may be regarded as partially neutralized pyrophosphoric acids. Their activities are characteristic of the phosphoric acids themselves, but the partial neutralization produces solid materials having desirable mechanical properties which permits their advantageous use in commercial reaction vessels. The metal phosphate catalysts may be employed without supporting materials, although they are preferably supported upon a wood charcoal, activated charcoal or a low-sulfur petroleum coke. Other suitable supports include alkaline earth metal sulfates and various non-reducible (and catalytically inactive) metal phosphates. A suitable catalytic composition is 60–75 weight percent of copper pyrophosphate supported on charcoal. The metal pyrophosphate catalysts are usually baked at about 220° F. to adjust the water concentration therein to about 40–60 weight percent, yielding a catalyst having a density to about 0.4 to about 0.5 gram per cubic centimeter. It is sometimes desirable to dilute the copper pyrophosphate-charcoal pellets with charcoal pellets in a volume ratio between about 1:1 and about 1:3. Alumina, clay and kieselguhr are not satisfactory supports for reducible metal pyrophosphate catalysts. These catalysts have been described in various United States Letters Patent, including the following: 2,336,793; 2,310,161; 2,237,822, etc.

Other useful species of catalysts are cadmium acid orthophosphate ($Cd(H_2PO_4)_2$) and cadmium copper acid orthophosphate. Calcium copper acid orthophosphate may also be used. These catalysts require no supports and calcination before use is optional. Catalysts of this type have been described in U. S. Patent 2,128,126 and British Patent 546,037.

We may also employ the so-called Tifo and Zrfo catalysts for the purposes of the present invention. The Tifo catalysts are solid, acidic, complex catalysts containing titanium, phosphorus, oxygen and hydrogen in chemical combination and they have been produced by a variety of techniques.

Tifo catalysts have been prepared by the reaction of a titanium halide, particularly $TiCl_4$, with orthophosphoric acid in molar ratios sufficient to furnish a halogen:hydrogen ratio between about 0.4 and about 1 at a temperature above about 175° C. for a period of time sufficient to evolve the halogen content of the reaction mixture as hydrogen halide in a substantial proportion of at least about 90%, and preferably at least about 96%, as described in application for United States Letters Patent, Serial No. 323,517 of Harold Shalit and Arthur P. Lien, filed December 1, 1952.

A Tifo catalyst may also be manufactured by mixing titanium dioxide, for example in the form of rutile, anastase or brookite, with triphosphoric acid or a mixture of phosphoric acid containing a substantial proportion (between about 10 and about 95 weight percent) of triphosphoric acid, and heating the doughy mixture to a temperature at which a vigorous, rapid, exothermic reaction occurs with the liberation and escape of water from the reaction mixture. The weight ratio of titanium dioxide to triphosphoric acid can be varied between about 0.1 and about 2, preferably between about 0.25 and about 1.3. The doughy initial mixture of titanium dioxide and triphosphoric acid can be shaped, as by extrusion or molding, before heating to the temperature at which the exothermic reaction occurs. The rapid exothermic reaction occurs at a temperature of about 240° C. and reaction can be effected at about 240° C. to about 330° C., usually about 250° C. In order to prepare a solid catalytic material of increased mechanical stability, the heating of the reaction mixture may be continued to higher temperatures up to about 600° C., more often to about 380° C. to about 400° C. The heating time can be varied from about 0.5 to about 4 hours, preferably about 2 hours. This method is described and claimed in the copending application for United States Letters Patent of P. N. Rylander and W. J. Zimmerschied, Serial No. 379,290, filed September 9, 1953.

The so-called Zrfo catalysts can be prepared by reaction between zirconium dioxide, for example in the form of baddeleyite, and a phosphoric acid selected from the group consisting of anhydrous orthophosphoric acid, pyrophosphoric acid and triphosphoric acid, in the proportions of between about 0.2 and about 3.0 mols of zirconia per gram atom of phosphorus contained in said phosphoric acid. Reaction is effected at temperatures between between about 220° C. and about 600° C. The catalyst is a complex, solid material containing zirconium, phosphorus, oxygen and hydrogen, and is highly acidic. The preparation of this catalyst is described in copending application for United States Letters Patent of P. N. Rylander and W. J. Zimmerschied, Serial No. 379,301, filed September 9, 1953. An alternative method for the preparation of Zrfo catalysts involves the reaction of $ZrCl_4$ with a phosphoric acid, employing a technique such as is used with the reaction of $TiCl_4$ with a phosphoric acid; the product should be heated until it is substantially free of halogen.

The following examples are presented in order to illustrate but not unnecessarily to limit the present invention. The hydrocarbon sulfide and hydrogen sulfide were charged in the vapor phase downwardly through a fixed bed of commercial, solid phosphoric acid polymerization catalyst at temperatures within the range indicated and at substantially atmospheric pressure at the rates shown in Table 1.

TABLE 1

| Example | 1 | 2 | 3 |
|---|---|---|---|
| Reaction Temperature, °F | 410–435 | 520–560 | 575–645 |
| Charge Rates: | | | |
| $(CH_3)_2S$ mol/hr | .2 | .15 | .2 |
| $H_2S$ mol/hr | .58 | .59 | .59 |
| Mols $H_2S$/mol $(CH_3)_2S$ | 2.9 | 4 | 2.9 |
| Analysis by Mass Spectrometer of Sample, Mol Percent: | | | |
| $H_2S$ | 78.2 | 68.1 | 56.3 |
| $CO_2$ | .6 | .3 | 1.4 |
| $CH_3SH$ | 5.5 | 15.5 | 18.5 |
| $(CH_3)_2S$ | 15.7 | 16.1 | 15.4 |
| $CO$ | | | 6.3 |
| $CH_4$ | | | 0.7 |
| $H_2$ | | | 1.4 |
| Mol Percent Methyl Sulfide Converted to Methyl Mercaptan | 14.7 | 32.3 | 32.1 |

It will be noted from the tabulated data that the desired reaction occurs without substantial side reaction. Even at temperatures as high as 645° F., very little side reaction was observed. Therefore, by separation of methyl sulfide from the reaction product mixture and its recycle to the reactor, substantially complete conversion thereof to methyl mercaptan may be obtained. This is likewise true of other hydrocarbon sulfide charging stocks, particularly the relatively stable alkyl sulfides.

*Example 4*

Di-n-butylsulfide and hydrogen sulfide were charged in a molar ratio of 2:1 through commercial phosphoric acid-kieselguhr catalyst at a space velocity of 2.0 cu. feet of gas per hour per pound of catalyst. The reaction was conducted at 580 to 600° F. and at atmospheric pressure. The liquid reaction products were distilled to separate n-butyl mercaptan (boiling range 96–99° C.) of 98.5% purity.

In Table 2 are presented data obtained by the reaction of dimethyl sulfide with hydrogen sulfide at about atmospheric pressure in the presence of Tifo and Zrfo catalysts. The Tifo catalyst was prepared by the reaction of 200 g. of rutile (93 w. percent $TiO_2$) with 300 g. of a commercial polyphosphoric acid having the following analysis:

Percent
Meta-phosphoric acid ($HPO_3$) _____ 3.6
Triphosphoric acid ($H_5P_3O_{10}$) _____ 47.8
Pyrophosphoric acid ($H_4P_2O_7$) _____ 28.6
Orthophosphoric acid ($H_3PO_4$) _____ 20.0

The polyphosphoric acid was heated to 200° C., the rutile was then added and the mixture was heated to form a solid catalyst, which was thereafter heated further in a muffle furnace at 440° C. for one-half hour, broken, and screened to 6–14 mesh/inch. The Zrfo catalyst was prepared by heating 450 g. of the above-described commercial polyphosphoric acid to 170° C., adding to it 300 g. of zircon and heating for 4 hours to 390° C. to form the solid catalyst, which was thereafter heated in a muffle furnace at 420° C. for 2 hours, broken, and screened to 6–14 mesh/inch. It will be noted from the table that in all instances substantial conversions of dimethyl sulfide to methyl mercaptan were obtained, although the particular Tifo catalyst was more active than the Zrfo catalyst at the same temperatures.

TABLE 2.—DIMETHYLSULFIDE AND $H_2S$ OVER Tifo AND Zrfo CATALYSTS

| Example | 5 | 6 | 7 | 8 |
|---|---|---|---|---|
| Charge Rates: | | | | |
| $H_2S$, mol/hr | 1.0 | 1.0 | 0.95 | 0.95 |
| Dimethyl Sulfide, mol/hr | 0.23 | 0.23 | 0.23 | 0.23 |
| Temperature, ° F | 530–540 | 550–560 | 540–560 | 550–560 |
| Catalyst | Tifo | Tifo | Zrfo | Zrfo |
| Analysis of Line Samples: | | | | |
| $H_2S$ | 76.0 | 75.3 | 77.8 | 76.1 |
| $CO_2$ | | .3 | | .2 |
| Dimethyl Ether | | .2 | | .2 |
| Methyl Mercaptan | 13.9 | 13.6 | 6.6 | 7.2 |
| Dimethyl Sulfide | 9.7 | 10.0 | 15.1 | 15.6 |
| $C_3$ (Misc.) | | .3 | .1 | .3 |
| $CS_2$ | .4 | .2 | .4 | .4 |
| C to S in Charge | .37 | .37 | .39 | .39 |
| C to S in Product | .34 | .35 | .37 | .37 |
| Mol Percent Dimethyl Sulfide Converted to Methyl Mercaptan | 42 | 39 | 18 | 19 |

In a commercial embodiment, the process of the present invention may be practiced in accordance with the accompanying figure and the following description. Methyl sulfide in pure or highly concentrated form, i. e. containing no impurities which react with hydrogen sulfide under the reaction conditions, is passed through valved line 10 into heater 11 in which it is vaporized and heated to a suitable reaction temperature, for example, between about 525° F. and about 625° F. at the desired reaction pressure, for example between about 15 and about 200 p. s. i. g. Small amounts of steam of the order of about 1 to 10 volume percent, based on the volume of methyl sulfide vapor, may be admitted into line 10 through valved line 12 when the catalyst employed is a solid phosphoric acid (or the like) which tends to become dehydrated during the course of reaction. The vaporous mixture of methyl sulfide and steam is introduced into the upper portion of reactor 13, which is provided with the catalyst. The reactor may be of the chamber type commonly employed in the polymerization of normally gaseous olefins with solid phosphoric acid catalysts, wherein the catalyst is retained upon a number of perforated trays which are disposed at different levels within the reactor. Alternatively, tower 13 may be of the "reactor" type which is well known for use in the polymerization of gaseous olefins with solid phosphoric acid catalyst, wherein the solid catalyst is contained within tubes surrounded by a circulating heat exchange medium. The hydrogen sulfide may be admitted into tower 13 through valved line 14, preheater 15 and a manifold arrangement 16, which permits the distribution of hydrogen sulfide at a number of spaced points along the length of the reactor to facilitate control of the extent of reaction in any given part of the reactor. A suitable molar ratio of hydrogen sulfide to methyl sulfide in any portion of the reaction zone may be between about 2 and about 1 mols. The space velocity of methyl sulfide may be between about 0.1 and about 50 volumes (calculated as liquid) per hour per volume of catalyst space.

The catalyst may be employed until its activity has become reduced to an undesirable level and it may then be replaced by fresh catalyst. If desired, catalyst regeneration may be effected by known methods, e. g. combustion of carbonaceous deposits with flue gas containing 1–10 volume percent oxygen and rehydration by steam at 400–600° F.

The vaporous effluents are withdrawn from the lower portion of tower 13 through line 17 and are passed through cooler 18 into a liquid-vapor separator 19. The temperature and pressure of the vaporous reactor effluent may be adjusted to provide for the facile separation of hydrogen sulfide and normally gaseous impurities boiling below the boiling point of methyl mercaptan, such as $H_2$, CO, $CO_2$ and methane. Suitable conditions in separator 19 are temperatures between about 75° F. and about 150° F. and pressures between about 80 and about 200 p. s. i. g. A gas stream comprising predominantly hydrogen sulfide, containing no impurities reactive with hydrogen sulfide under the conditions in tower 13, is withdrawn from separator 19 through valved line 20, whence all or a portion thereof may be recycled through valved line 21 into manifold 16 for re-entry into tower 13. From time to time, it is desirable to divert a portion of the vapors passing through line 20 into hydrogen sulfide-purification equipment schematically indicated by the legend 22. In equipment 22, the $H_2S$ stream can be purified by known means, for example, by treatment with potassium phosphate, triethanolamine, or the like, to produce highly concentrated hydrogen sulfide, which can be recycled to tower 13 through valved line 23, and impurities which are removed from the system through valved line 24.

Liquid is withdrawn from the pool in the lower portion of separator 19 through valved line 25, whence it is passed through heater 26 into fractionating tower 27. In tower 27, which may be provided with conventional fractional distillation means, methyl mercaptan product is taken overhead to line 28 and condenser 29 into liquid accumulator drum 30, provided with valved gas vent 31. A portion of the liquid methyl mercaptan may be withdrawn from the system as product through line 32 and valved line 33 and the remainder may be recycled as reflux to tower 27 through valved line 34.

The fractionating tower bottoms which consist essentially of methyl sulfide and some of the water introduced at an earlier stage of the process, is withdrawn through line 35, whence a portion may be withdrawn from the system through valved line 36. However, at least a portion of the methyl sulfide bottoms is recycled through valved line 37 into line 10 for re-entry into reactor 13.

It will be understood that the figure represents a simplification of the commercial form of the invention and that numerous engineering details such as pumps, valves, compressors, flow regulators, liquid level regulators, safety lines, etc. have been omitted in the interests of simplifying the description and for the further reason that their employment would be obvious to any skilled chemical engineer apprised of the present process.

Having thus described our invention, what we claim is:

1. In the process which comprises contacting reactants consisting essentially of a hydrocarbon sulfide and hydrogen sulfide with a catalyst to produce a hydrocarbon mercaptan, the improvement which comprises effecting said contacting of said reactants with a solid pentavalent phosphorus acid olefin polymerization catalyst at a reaction temperature between about 500° F. and about 700° F., and separating a hydrocarbon mercaptan from the products of reaction thus produced.

2. The process of claim 1 wherein said catalyst comprises a solid support and between about 30 weight percent and about 90 weight percent of a phosphoric acid, based on the total weight of said catalyst.

3. The process of claim 1 wherein said catalyst comprises a silicious support and between about 30 weight percent and about 90 weight percent of a phosphoric acid, based on the total weight of said catalyst.

4. The process of claim 1 wherein said catalyst comprises a silicious support and between about 30 weight percent and about 90 weight percent of pyrophosphoric acid, based on the total weight of said catalyst.

5. The process of claim 1 wherein said catalyst is a solid material prepared by heating titanium dioxide and a mixture of phosphoric acids comprising triphosphoric acid, in a weight ratio between about 0.1 and about 2, at a temperature between about 240° C. and about 600° C.

6. The process of claim 1 wherein said catalyst is a solid material prepared by heating zirconia and an acid of phosphorus selected from the class consisting of substantially anhydrous orthophosphoric acid, pyrophosphoric acid and triphosphoric acid in proportions between about 0.2 and about 3 mols of zirconia per gram atom of phosphorus contained in said acid of phosphorus at a reaction temperature between about 220° C. and about 600° C.

7. The process of claim 1 wherein said hydrocarbon sulfide is an alkyl sulfide.

8. The process of claim 1 wherein said hydrocarbon sulfide is methyl sulfide.

9. The process of claim 1 wherein said hydrocarbon sulfide is n-butyl sulfide.

10. The process which comprises contacting reactants consisting essentially of an alkyl sulfide and between about 1 and about 10 mols of hydrogen sulfide per mol of said alkyl sulfide in a reactor with a solid phosphoric acid olefin polymerization catalyst at a reaction temperature between about 525° F. and about 625° F., separating from the reactor effluent an alkyl mercaptan and alkyl sulfide, and recycling at least a portion of said alkyl sulfide to said reactor.

11. The process of claim 10 wherein said alkyl sulfide is methyl sulfide.

12. The process of claim 10 wherein said alkyl sulfide is n-butyl sulfide.

13. The process of claim 10 wherein said catalyst compriss a silicious support and between about 30 weight percent and about 90 weight percent of pyrophosphoric acid.

14. The process which comprises contacting reactants consisting essentially of methyl sulfide and hydrogen sulfide in the vapor phase at a reaction temperature between about 500° F. and about 700° F. with a solid phosphoric acid polymerization catalyst comprising a silicious support and between about 30 weight percent and about 90 weight percent of pyrophosphoric acid, and separating methyl mercaptan as a reaction product.

15. The process which comprises contacting reactants consisting essentially of methyl sulfide and hydrogen sulfide in the vapor phase with a Tifo catalyst of the type prepared by heating titanium dioxide and a mixture of phosphoric acids comprising triphosphoric acid, in a weight ratio between about 0.1 and about 2, at a temperature between about 465° F. and about 1110° F., effecting said contacting at a reaction temperature between about 525° F. and about 625° F., and separating methyl mercaptan as a reaction product.

16. The process which comprises contacting reactants consisting essentially of methyl sulfide and hydrogen sulfide in the vapor phase with a Zrfo catalyst of the type prepared by heating zirconia and an acid of phosphorus selected from the class consisting of substantially anhydrous orthophosphoric acid, pyrophosphoric acid and triphosphoric acid is proportions between about 0.2 and about 3 mols of zirconia per gram atom of phosphorus contained in said acid at a reaction temperature between about 430° F. and about 1110° F., effecting said contacting at a temperature betwee about 525° F. and about 625° F., and separating methyl mercaptan as a reaction product.

References Cited in the file of this patent
UNITED STATES PATENTS

| | | |
|---|---|---|
| 2,051,806 | Allen | Aug. 25, 1936 |
| 2,116,182 | Baur | May 3, 1938 |
| 2,366,453 | Meadow | Jan. 2, 1945 |
| 2,565,195 | Bell | Aug. 21, 1951 |
| 2,667,515 | Beach et al. | Jan. 26, 1954 |